April 10, 1934.   W. M. EDWARDS ET AL   1,954,564
INTERNAL COMBUSTION ENGINE
Filed May 25, 1931   2 Sheets-Sheet 1

INVENTORS
William M. Edwards
Frederick C. Jearum
Joseph L. Jameson
BY
ATTORNEY

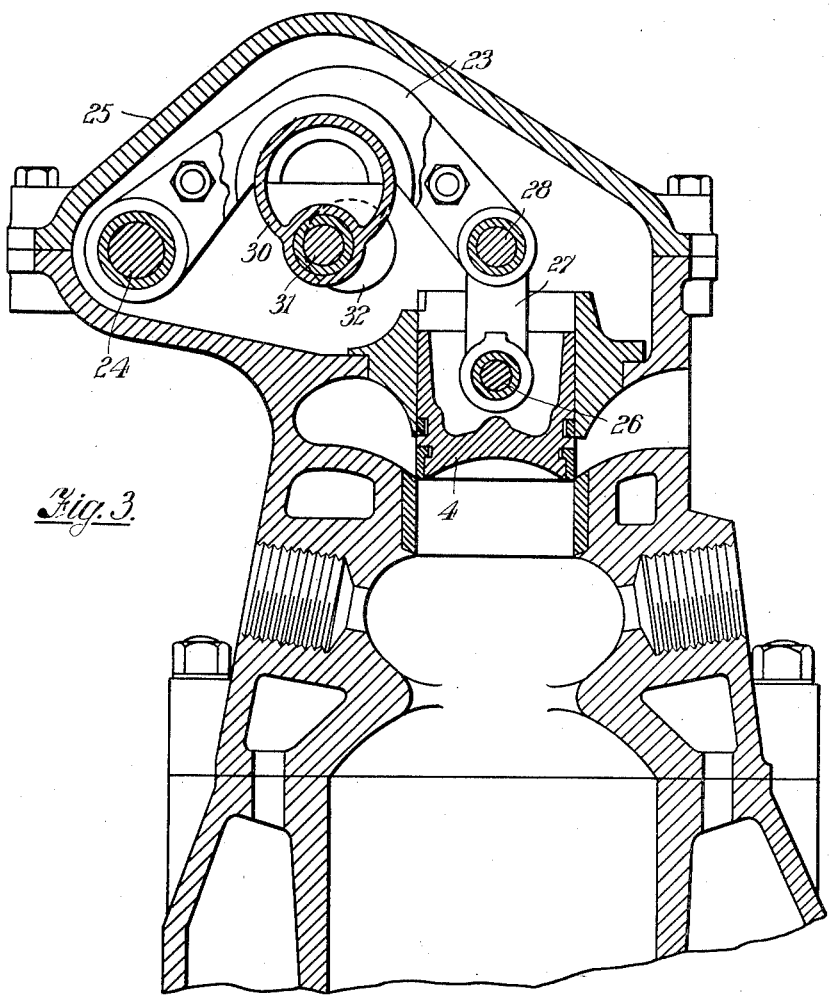
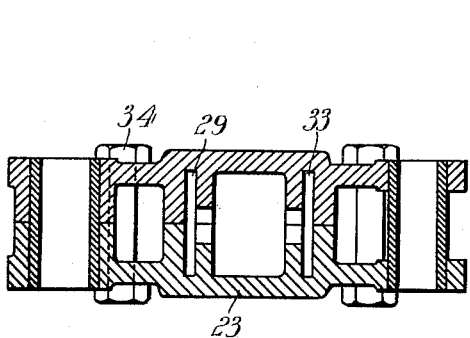
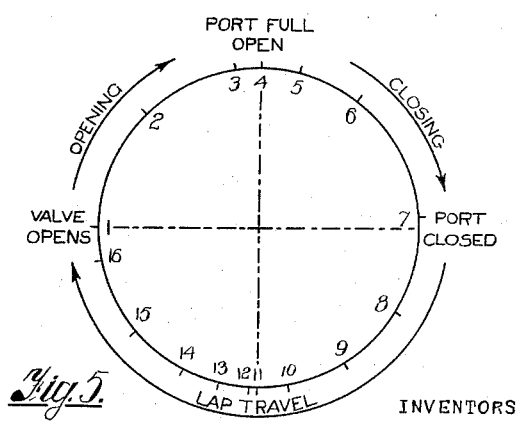

Patented Apr. 10, 1934

1,954,564

UNITED STATES PATENT OFFICE 1,954,564

INTERNAL COMBUSTION ENGINE

William Maitland Edwards, London, Frederick Charles Jearum, North Cheam, and Joseph Lambert Jameson, Cheam, England Application May 25, 1931, Serial No. 539,926
In Great Britain May 26, 1930

10 Claims. (Cl. 123—65)

This invention relates to internal combustion engines of the two stroke cycle supercharged type and has for its object to provide improvements in the construction and operation of such engines and more particularly in the means for introducing the working charge to the cylinder and for exhausting the combustion products therefrom, the invention being designed to increase the efficiency of the engine, particularly at high speeds by reducing loss of pressure due to turbulence to a minimum so that rapid intake of a new charge and exhaust of spent gases is achieved.

The invention consists primarily in a two stroke cycle super-charged internal combustion engine wherein the combustion mixture is fed to an annular chamber surrounding the inlet valve, the admission ports from said annular chamber being symmetrically streamlined about the axis of the valve.

According to the preferred form of the invention the improved internal combustion engine comprises a piston inlet valve disposed coaxially with a working cylinder to control inlet ports inclined downwardly and of gradually decreasing cross section towards a cylindrical inlet chamber opening into a substantially spherical compression space disposed symmetrically about the axis of the cylinder. The piston inlet valve is operated from an overhead crank shaft the operation of which is timed so that whilst the piston valve moves rapidly when uncovering the inlet ports, there is a period of relatively slow and inoperative movements when the piston valve is in its lowermost position during the firing stroke. The exhaust ports are uncovered as the working piston moves to bottom dead centre position and are formed with smoothly diverging walls so shaped that the cross section of the gas passage gradually increases from the exhaust ports to the exhaust conduit with which the ports communicate.

Reference will now be made to the accompanying drawings which illustrate by way of example constructions according to the invention and in which:—

Fig. 3 is a vertical sectional elevation of a modified construction.

Fig. 4 is a sectional plan of part of the inlet valve operating mechanism shown in Fig. 2 and Fig. 5 is a diagram to illustrate the variations in the speed of movement of the inlet valve.

Figures 1, 2:
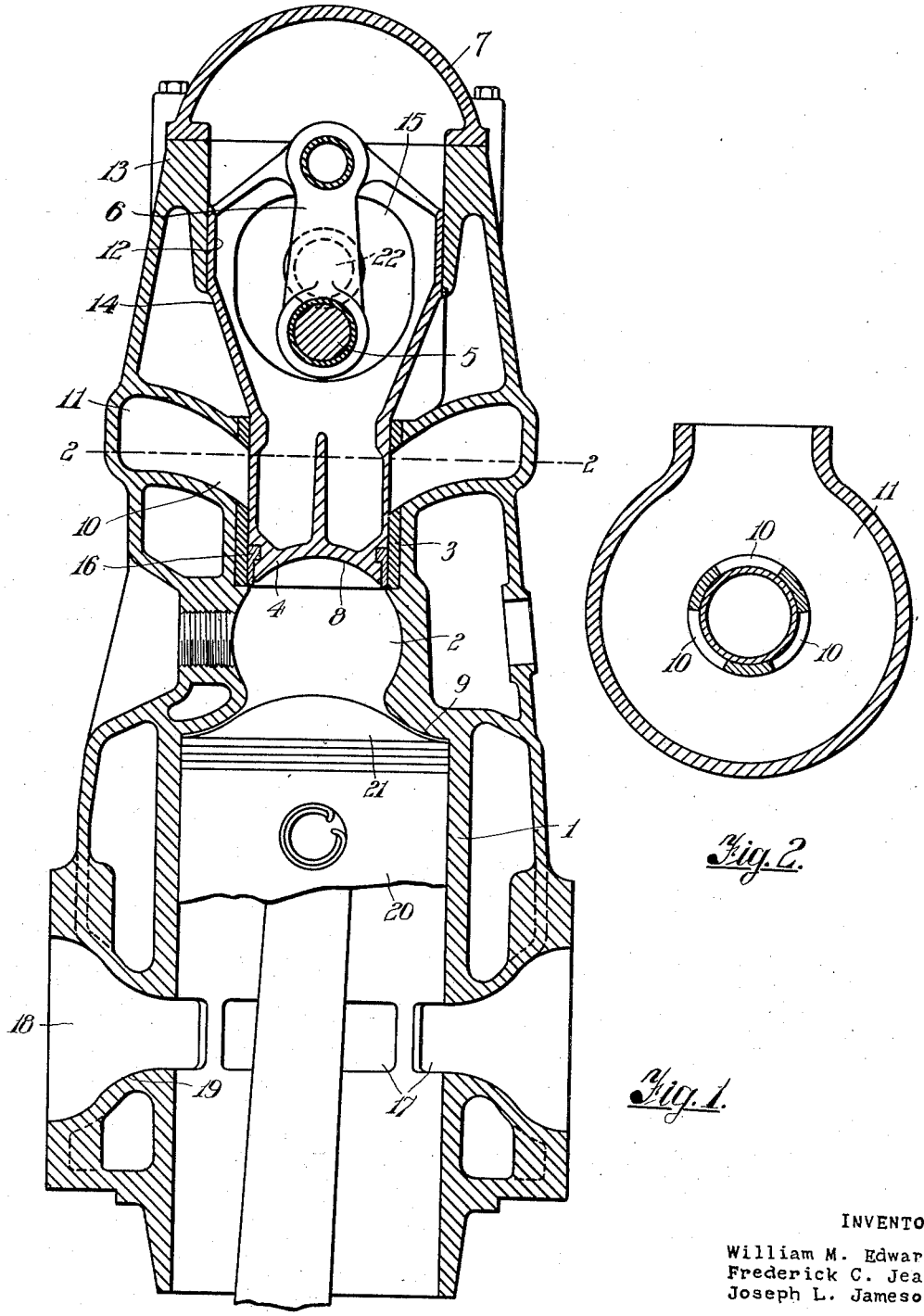
Fig. 1 is a vertical sectional elevation showing cylinder, compression space and valve casing.
Fig. 2 is a sectional plan taken on the line 2—2 of Fig. 1 showing the inlet ports.

Referring first to Figs. 1 and 2, 1 indicates a working cylinder above and in axial alignment with which is formed a compression space 2 of substantially spherical form which communicates with a cylindrical inlet chamber 3 also formed coaxially with the working cylinder and closed by a piston slide valve 4 operated by a crank 5 and connecting rod 6 mounted in a crank casing 7 above the cylinder head. The head of the piston valve 4 has a concave surface 8 which merges with the surface of the compression space 2 when the piston valve is at the lower dead centre position as shown so as to complete the substantially spherical compression space which communicates with the working cylinder 1 through a divergent opening 9 formed to facilitate the flow of gas. The cylindrical inlet chamber 3 communicates through ports 10 in its cylindrical walls with an annular inlet conduit 11 to which combustible mixture is supplied from a super-charger, the annular conduit and ports being inclined downwardly as shown towards the cylindrical inlet chamber 3 and being of gradually decreasing cross section towards the inlet chamber so as to produce a Venturi effect upon the gases passing into the cylinder 1 when the valve 4 is in its upper and open position.

The piston valve 4 is formed with a hollow cylindrical crosshead 12 which bears on a cylindrical guide 13 formed in the crank chamber 7. The crosshead is preferably of larger diameter than the piston valve itself as shown in Fig. 1 and is connected thereto by a conical skirt 14 so as to enable the crank and connecting rod 5 and 6 to be accommodated within the crosshead 12, suitable openings 15 being formed in the crosshead 12 and skirt 14 to permit the crank 5 to pass therethrough. The piston valve 4 is provided with expanding sealing rings 16 of similar construction to the rings of an ordinary piston.

The exhaust from the cylinder 1 takes place through ports 17 near the lower end of the cylinder and these ports are uncovered by the working piston as the latter moves to its bottom dead centre position. The exhaust ports 17 communicate with an annular exhaust conduit 18 and are formed with smoothly diverging walls as shown at 19 so shaped that the cross section of the gas passage gradually increases from the exhaust ports 17 to the exhaust conduit 18. The head of the piston 20 is of convex form as shown at 21 and suitably curved to facilitate gas flow through the exhaust ports. The curvature of the piston head nearer its edge also conforms to the shape of the divergent opening 9 between the compression space 2 and the cylinder 1 thereby facilitating the symmetrical distribution of gases from the compression space. The crank shaft 22 carrying the crank 5 is operated synchronously with the main crank shaft through any suitable gearing and means may be provided to permit the throw of the piston valve to be adjusted or displaced in phase relatively to the working piston 20 for the purpose of regulating the timing.

In the form of construction illustrated in Figs. 3 and 4 the general operation and the construction and arrangement of the inlet and exhaust ports is similar to that of the engine illustrated in Figs. 1 and 2 but in this case the movements of the piston valve 4 are effected by rocking an arm 23 pivotally mounted at 24 in a casing 25 formed above the cylinder head. This arrangement is provided as an alternative to the construction shown in Figure 1 to meet conditions where it is desirable to reduce the overall height of the engine.

In the construction of Fig. 3 the piston valve 4 is provided with a gudgeon pin 26 connected by a link 27 with one end of the arm 23 the connection 28 being of a pivotal character. The arm 23 is of substantially right angled form as shown with the bend at its mid-portion extending upwardly and at this point the arm is slotted at 29 for engagement by a ring 30 formed integral with or fixed to a crank pin 31 on an overhead crank shaft 32 operated through suitable gearing from the main crank shaft.

To enable the ring 30 to be mounted in the arm 23 this arm is longitudinally divided as shown in Fig. 4 the two halves being formed with annular recesses 33 which co-operate on assembly to form the annular slot 29 in which the ring element 30 is inserted prior to connecting together the two halves of the arm 23 by means of the bolts and nuts 34. The object of this arrangement is to bring the centres of the crank pin 31 and pivot pin 28 as near as possible together to obtain the necessary angularity with minimum of overhead space. As the crank shaft 32 rotates the crank pin 31 imparts a combined oscillatory and up and down movement to the ring 30 the up and down movement being transmitted through the arm 23 and link 27 to the piston valve 4. The rotation of the crank shaft 32 is so timed that the ascending and descending movements of the crank pin 31 coincide with the movement of the piston valve 4 past the inlet ports so that rapid opening and closing of these ports takes place whilst when the piston valve is at the bottom of its stroke the crank pin is passing through its lower dead centre position causing a period of relatively slow and inoperative movement of the piston valve during the firing stroke. The variations in speed of movement of the piston valve in the form of construction shown in Fig. 3 are illustrated diagrammatically in Fig. 5 wherein the divisions marked 1—16 show the proportions of distance travelled by the piston valve during each sixteenth part of a revolution of the overhead crank shaft. It will be observed that the movements of the piston valve are most rapid over the sectors 1—2, 2—3, and 6—7 whilst the inlet ports are being uncovered and covered whilst the movement of the piston is relatively slow and inoperative over the points 10—13 around the bottom dead centre position producing what is in effect a period of dwell of the piston valve during the firing stroke.

The invention possesses the advantage that owing to the Venturi form of the inlet and exhaust ports and their arrangement together with the compression space and its diverging walls symmetrically about the axis of a working piston the gas flow is conducted in a most efficient manner so that loss of pressure due to turbulence is reduced to a minimum. This reduction of turbulence has the further effect of ensuring more perfect stratification of the gases in the cylinder with the result that there is little mixing of the old charge with the new.

We claim:

1. A two stroke cycle supercharged internal combustion engine, including a working piston and a cylinder therefor, a piston inlet valve disposed at one end of said cylinder coaxially with the working piston, said cylinder having a head formed with a valve chamber for said piston valve and communicating with said cylinder said head having an annular inlet chamber about said piston valve chamber and whose walls are inclined towards the cylinder and terminating in ports opening through the walls of and into said valve chamber.

2. A two stroke cycle supercharged internal combustion engine, including a working piston and a cylinder therefor, an overhead piston inlet valve disposed coaxially with said working piston; said cylinder having a head provided with a valve chamber in which said piston valve reciprocates and a spherical compression chamber communicating with said valve chamber and said cylinder, and said head also formed with an annular chamber about said valve chamber and whose walls converge toward said working cylinder and terminate in inlet ports opening into said valve chamber and controlled by said piston valve, said cylinder having exhaust ports in the side walls thereof controlled by said working position whereby the flow of gas into and out of the working cylinder is facilitated for reducing turbulence and preventing mixing of the old charge with the new.

3. A two stroke cycle internal combustion engine according to claim 1 including means for so timing the movements of the piston inlet valve that explosion takes place when said valve is at its inner dead centre position in order to minimize the effect of the explosion on the valve operating mechanism.

4. A two stroke cycle internal combustion engine according to claim 1 including an overhead crank shaft for operating the piston inlet valve, the operation of said crank shaft being so timed as to cause the piston valve to move rapidly whilst uncovering the inlet ports and to move relatively slowly after covering the inlet ports and while the piston valve is moving toward its outermost position during the firing stroke.

5. A two stroke cycle internal combustion engine according to claim 1 wherein the piston valve has on its outer end a substantially cone shaped extension provided with a pair of diametrically disposed openings, a gudgeon pin is carried by said coned extension and extends through said openings, and a crank shaft is disposed below said gudgeon pin and connected thereto.

6. A two stroke cycle internal combustion engine according to claim 1 including a pivoted lever connected at one end to the piston valve, a shaft outwardly of the piston valve, and means mounted on said shaft and serving to oscillate said lever about its pivot.

7. A two stroke cycle internal combustion engine according to claim 1 wherein the piston valve has on its inner face a concave surface so shaped as to form with the surface of the compression chamber a substantially spherical compression space when the piston valve is in its innermost position.

8. A two stroke cycle internal combustion engine according to claim 1 wherein the working piston has a head of convex form to enter the gas compression space and curved towards its edges to facilitate gas flow into the cylinder and through the exhaust ports.

9. A two stroke cycle internal combustion engine comprising a working piston and a cylinder therefor, said cylinder having exhaust ports, a piston inlet valve and a cylinder therefor, said piston valve cylinder being disposed coaxially with said working piston and forming a valve chamber, an annular inlet conduit surrounding said valve chamber and having walls inclined toward said working cylinder and terminating in ports in the walls of said valve chamber, a body formed with a substantially spherical compression space between said valve chamber and said working cylinder, and an exhaust conduit communicating with said exhaust ports in the working cylinder and having the walls thereof diverging outwardly from said ports.

10. A two stroke cycle internal combustion engine comprising a working piston and a cylinder therefor, said cylinder having exhaust ports, a piston inlet valve and a cylinder therefor, said piston valve cylinder being disposed coaxially with said working piston and forming a valve chamber, an annular inlet conduit surrounding said valve chamber and having walls inclined toward said working cylinder and terminating in ports in the walls of said valve chamber, a body between said valve chamber and said working cylinder and having a substantially spherical combustion space communicating with said working cylinder, the surface of said piston valve adjacent said compression space conforming with the curvature of said spherical space, and the walls of the opening between said spherical compression space and said cylinder diverging towards said working cylinder, the head of said working piston being curved to conform with the curvature of said diverging walls of the last-named opening, and an annular conduit surrounding said working cylinder and communicating with said exhaust ports, said annular conduit having its walls diverging outwardly from said exhaust ports.

WILLIAM MAITLAND EDWARDS.
FREDERICK CHARLES JEARUM.
JOSEPH LAMBERT JAMESON.